(12) United States Patent
Hahn et al.

(10) Patent No.: US 7,966,288 B2
(45) Date of Patent: Jun. 21, 2011

(54) DEVICE AND METHOD FOR INTEGRATING FILE SYSTEMS

(75) Inventors: Judah Gamliel Hahn, Ofra (IL); Donald Ray Bryant-Rich, Haifa (IL); Rotem Gazit, Kfar Saba (IL); Ziv Baduach, Moshav Yarhiv (IL)

(73) Assignee: SanDisk IL Ltd., Kfar Saba (IL)

( * ) Notice: Subject to any disclaimer, the term of this patent is extended or adjusted under 35 U.S.C. 154(b) by 380 days.

(21) Appl. No.: 11/968,202

(22) Filed: Jan. 2, 2008

(65) Prior Publication Data
US 2009/0172049 A1 Jul. 2, 2009

(51) Int. Cl.
  G06F 7/00 (2006.01)
  G06F 17/30 (2006.01)
(52) U.S. Cl. ......................... 707/636; 707/824
(58) Field of Classification Search .................. 707/205, 707/636
  See application file for complete search history.

(56) References Cited

U.S. PATENT DOCUMENTS

| | | | |
|---|---|---|---|
| 6,173,293 B1* | 1/2001 | Thekkath et al. ................. 1/1 | |
| 7,073,010 B2 | 7/2006 | Chen et al. | |
| 7,184,264 B2 | 2/2007 | Le | |
| 2001/0037406 A1* | 11/2001 | Philbrick et al. ............. 709/250 | |
| 2004/0133650 A1 | 7/2004 | Miloushev et al. | |
| 2005/0005044 A1 | 1/2005 | Liu et al. | |
| 2005/0120157 A1* | 6/2005 | Chen et al. ..................... 710/313 |
| 2006/0015676 A1* | 1/2006 | Oribe et al. ..................... 711/103 |
| 2007/0058933 A1* | 3/2007 | Kobayashi et al. ............. 386/95 |
| 2007/0065119 A1* | 3/2007 | Pomerantz ..................... 386/125 |
| 2007/0271558 A1* | 11/2007 | Lim et al. ....................... 717/174 |

FOREIGN PATENT DOCUMENTS

EP 1650665 4/2006

OTHER PUBLICATIONS

International Search Report and Written Opinion for International Application No. PCT/IL2008/000042 dated Jul. 28, 2008, 13 pages.

* cited by examiner

*Primary Examiner* — Don Wong
*Assistant Examiner* — Binh V Ho
(74) *Attorney, Agent, or Firm* — Toler Law Group

(57) ABSTRACT

The present invention enables a user to increase storage capacity for a host by using multiple storage devices. File systems are virtualized regardless of any difference in file system format. The invention may be embodied as a device for integrating file systems or as a method of integrating file systems. The device has one or more storage device interfaces for storage devices, a host interface, and a hub connected to the interfaces. The hub creates a virtual file system that aggregates the storage device file systems of storage devices that are connected to the storage device interfaces. The method of integrating file systems includes reading file systems, interpreting them, creating a logical structure containing data of the file systems, and generating in a memory sectors that map the logical structure into a virtual file system.

20 Claims, 3 Drawing Sheets

DEVICE AND METHOD FOR INTEGRATING FILE SYSTEMS

BACKGROUND

Despite the increased storage capacities of newly developing storage devices, such as the most recent versions of a USB flash drive, a user's storage needs will often exceed that which was once adequate. At that point, the user wanting to increase storage capacity has various options. One option is to obtain a new storage device with a greater capacity, when such a storage device becomes available, and the user will then have the task of transferring all existing stored data from the old storage device to the new storage device. The old storage device then becomes an unused resource.

Another option for a user wanting to increase storage capacity is to obtain additional storage devices and store data on the old and new devices. The user then has to manage data that is stored on multiple storage devices. The task can become burdensome as the user needs to access more and more file systems instead of one, which is the case when a single storage device has enough capacity for all the user's needs.

It would be desirable to be able to increase a host's storage capacity by using multiple storage devices and to be able to combine the device contents into a unified file system regardless of any difference in the file system formats of the underlying storage devices.

SUMMARY

The present inventors have developed devices and methods for integrating file systems, which enable a user to increase storage capacity for a host by using multiple storage devices and virtualizing the device contents into a single file system regardless of any difference in the device file systems.

According to an example embodiment, a device for integrating file systems includes one or more storage device interfaces, a host interface, and a hub. The storage device interfaces are for storage devices, each of which has a storage device file system. The hub is operationally connected to the storage device interfaces and to the host interface, and the hub is operative to create a virtual file system that aggregates the storage device file systems. The virtual file system may aggregate the storage device file systems according to one or more first conditions, at least one of which may be a host-level condition or a file-level condition. The hub may be further operative to distribute the contents of a file received from the host interface to at least two of the storage devices and to represent the file in the virtual file system as an undivided entity. Alternatively, the hub may be further operative to route the contents of a file received from the host interface to only one of the storage devices according to one or more second conditions.

The device may have additional features. For example, at least one of the storage device interfaces may comply with the USB standard. Also, the host interface may be a wired interface, and the wired interface may comply with the USB standard. The host interface may be a wireless interface. The hub may be further operative to create and maintain redundant file systems.

According to an example embodiment, a method of integrating file systems includes reading file systems of two or more storage devices, interpreting the file systems, creating a logical structure containing the data in the interpreted file systems, and generating in a memory sectors that map the logical structure into a virtual file system. The reading of the file systems may include communicating in compliance with the USB standard. The logical structure may be created according to one or more first conditions, at least one of which can be a host-level condition or a file-level condition. The method may include creating and maintaining a redundant file system.

The method may further include representing a file in the virtual file system as an undivided entity, wherein the contents of the file are distributed across two or more of the storage devices. Alternatively, the method may further include routing the contents of a file received from a host to only one of the storage devices according to one or more second conditions.

The method may further include representing the virtual file system to a host through a wired interface, and the wired interface may comply with the USB standard. Alternatively, the method may include representing the virtual file system to a host through a wireless interface.

Example embodiments are described in detail below with reference to the accompanying drawings, which are briefly described as follows.

BRIEF DESCRIPTION OF THE DRAWINGS

The invention is described below in the appended claims, which are read in view of the accompanying description including the following drawings, wherein:

DETAILED DESCRIPTION

The claims below will be better understood by referring to the present detailed description of example embodiments. This description is not intended to limit the scope of claims but instead to provide examples. Described first is an exemplary embodiment of a file system integrator. Described next is an alternate exemplary embodiment of a file system integrator. Also presented is a method of integrating file systems.

Figure 1:
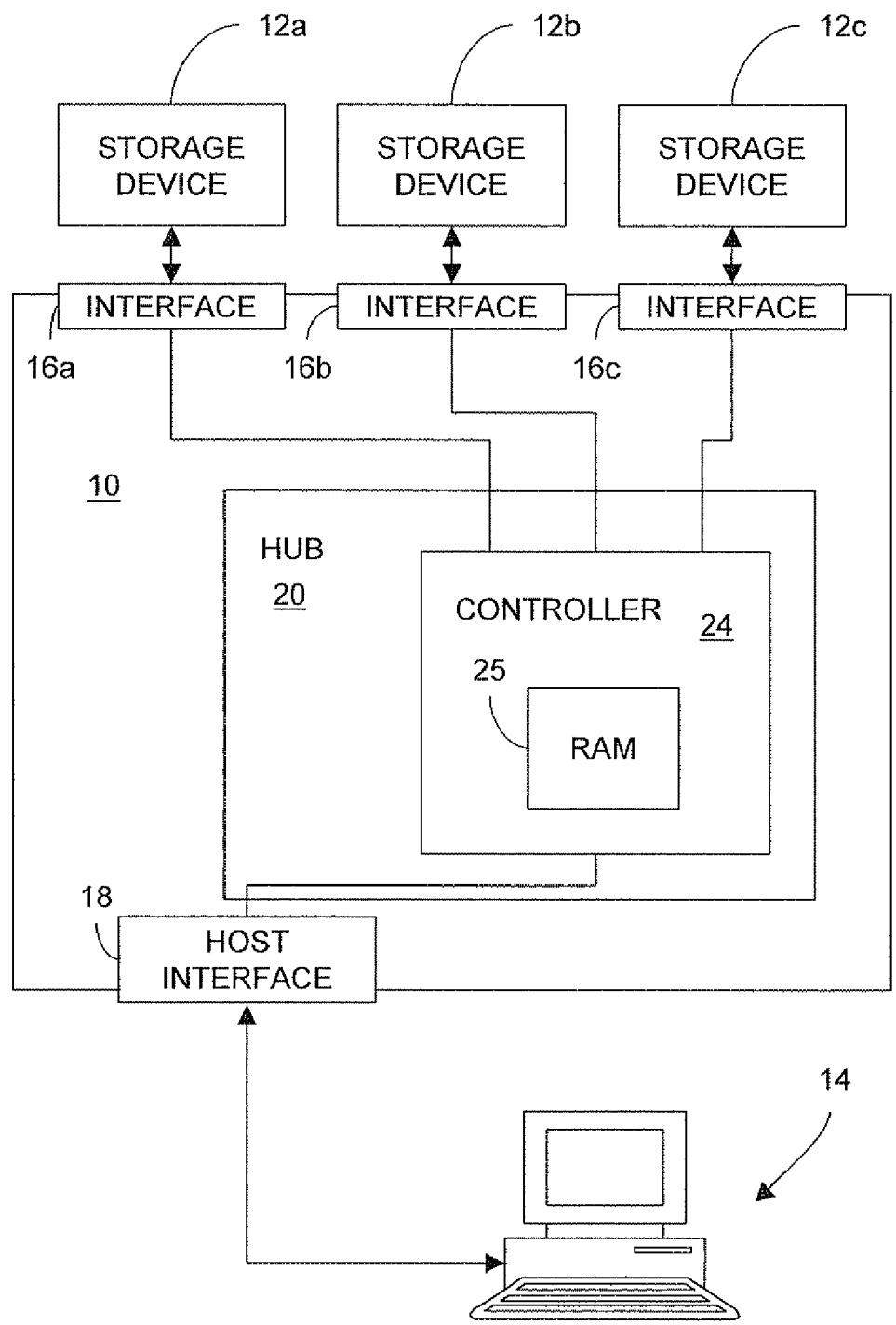
FIG. 1 illustrates a system including a file system integrator in accordance with a first example embodiment.

FIG. 1 illustrates, in accordance with an exemplary embodiment, a file system integrator 10 in combination with storage devices 12a, 12b, and 12c and a host 14. Non-limiting examples of storage devices in this system include USB flash drives, compact disks (CDs), and DVDs. The host 14 shown in FIG. 1 is a personal computer, but other hosts that can be fashioned to operate with the file system integrator include, e.g., vehicle entertainment systems and DVD players. The file system integrator 10 enables a user to integrate file systems regardless of any differences in the individual file systems (e.g., in the file system formats) of the attached storage devices.

The file system integrator 10 includes storage device interfaces 16a, 16b, and i 6c, a host interface 18, and a hub 20. The storage device interfaces 16a, 16b, and 16c connect the storage devices 12a, 12b, and 12c, respectively, to the hub 20. Each of the storage devices 12a, 12b, and 12c has a storage device file system. The hub 20 is also connected to the host interface 18. The hub 20 can be implemented as hardware, software, firmware, or any combination thereof. In this example embodiment, the hub 20 includes a controller 24, which has a RAM 25. Although this example embodiment involves three storage devices and three corresponding storage device interfaces, it will be understood that the number of storage devices and corresponding storage device interfaces is not limited to this.

Upon connection of the storage devices 12a, 12b, and 12c, a controller 24 of the hub 20 creates a virtual file system that aggregates the individual storage device file systems. The virtual file system may operate to aggregate the storage device file systems according to special conditions. Such operation can be useful in situations where system resources did not need to be used to aggregate the information of files that would not be used by a particular host. For example, if the file system integrator 10 were intended for a host that is a DVD player, the file system could operate according to a special condition whereby the file system disregards during aggregation any information relating only to files that the DVD player could not read. The resulting virtual file system would represent to the DVD player only the files that it could read.

The hub 20 may store a file from the host 14 by distributing the contents of the file to at least two of the storage devices 12a, 12b, and 12c. The stored file would nonetheless be represented in the virtual file system as an undivided entity. Distributing file contents among multiple storage devices is useful, for example, when none of the storage devices 12a, 12b, and 12c individually has enough free space for the file, but the total amount of unused space in the storage devices collectively is enough.

The above example of aggregating only files in DVD format is an example of a host-level condition. The host may additionally or alternatively aggregate files according to a file-level condition. For example, if files contents from a file sent by the host 14 were previously distributed across multiple storage devices, and one of those storage devices were not presently connected to the host 14, the complete contents of the file would not be available to the host 14. The hub 20 may then aggregate according to the file-level condition that information relating to files in which the complete contents are not available is disregarded.

Alternatively, the hub 20 may be designed to route the contents of a file received from the host 14 to only one of the storage devices 12a, 12b, and 12c according to one or more special conditions. For example, a condition could be to route the contents of a file to only one of storage devices 12a, 12b and 12c, if a particular one of the storage devices has enough room for the file; such routing would save system resources by eliminating spanning as unnecessary. Another example condition would be to route the contents of a file to a particular storage device based on the file type; for instance, all DVD files would be stored on the storage device 12a, all audio files would be stored on the storage device 12b, and remaining files would be stored on the storage device 12c.

According to this example embodiment, the storage device interfaces 16a, 16b, and 16c comply with the USB standard. However, storage device interfaces complying with other standards may be implemented instead or in addition.

Again, according to this example embodiment, the host interface 18 complies with the USB standard, but alternate embodiments may use different wired interfaces as the host interface. As a further alternative, the host interface could be a wireless interface.

The hub 20 may be designed to create and maintain redundant file systems. An example of such a file system would be that of RAID (Redundant Arrays of Independent Disks) 1. RAID is an industry standard that encompasses data storage schemes that divide and/or replicate data among multiple hard drives. A number of standard schemes have evolved which are referred to as levels. The first level (designated as "RAID-1") creates an exact copy (or mirror, or replica) of a set of data on two or more disks in a way that is transparent to the host. Hub 20 may also create and maintain redundant file systems using other ways known to those of skill in the art.

Figure 2:
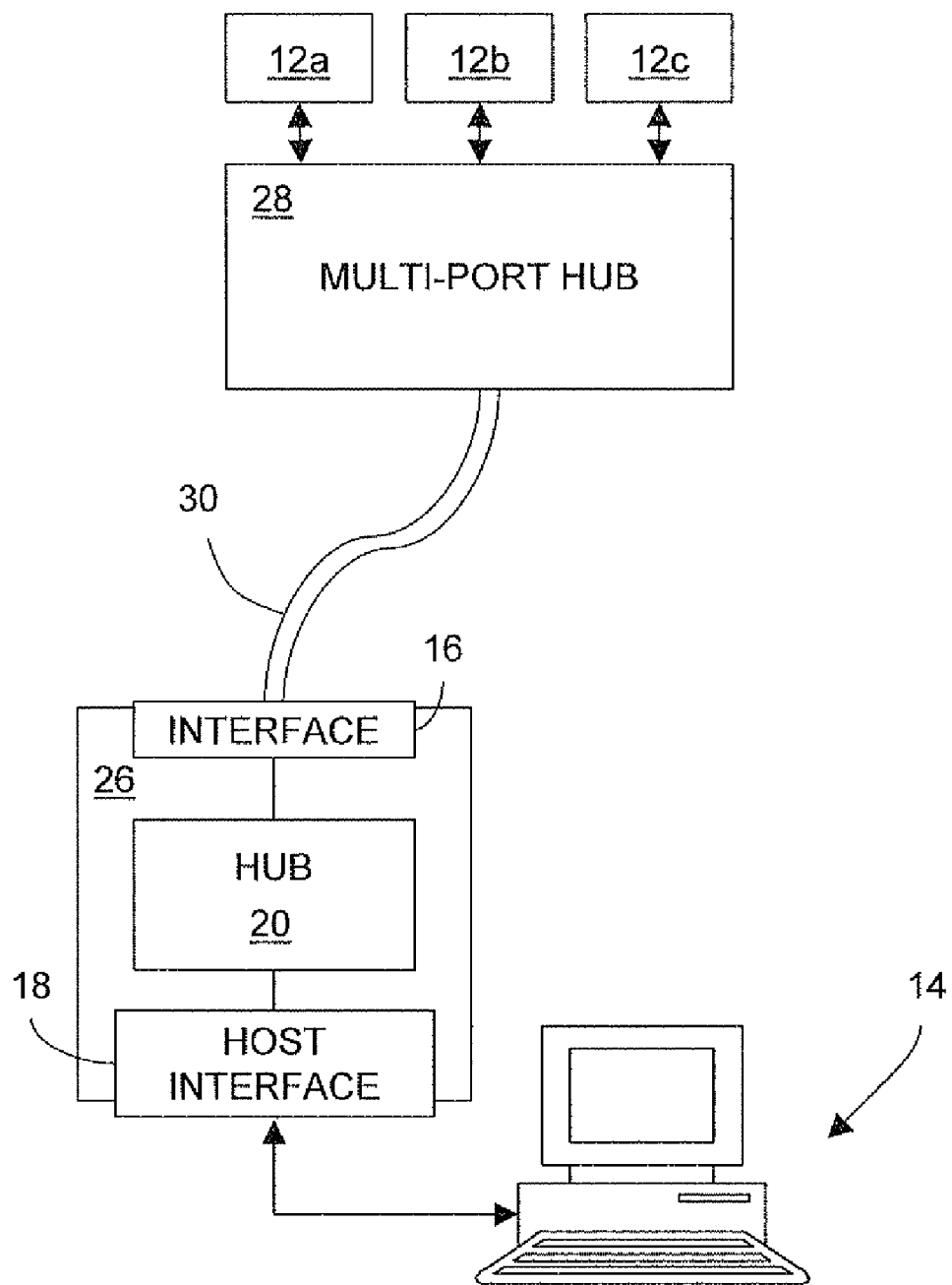
FIG. 2 illustrates a system including a file system integrator in accordance with an alternate example embodiment.

Although the above example embodiment includes multiple storage device interfaces 16a, 16b, and 16c, the device may be implemented as a file system integrator 26 having only one interface 16, as shown in FIG. 2. The other elements of the file system integrator 26 are the same as in the first example embodiment, as represented using the same reference numbers. (Hub 20 of the file system integrator 26 also includes a controller 24 and RAM 25, as shown in FIG. 1, even though for convenience these elements have been omitted from FIG. 2.) Note also that as with the example embodiment represented in FIG. 1, although the example embodiment of FIG. 2 involves only one storage device and one storage device interface, the number of storage devices and storage device interfaces is not limited to such.

According to the embodiment shown in FIG. 2, the hub 20 still creates a virtual file system that aggregates individual storage device file systems, even though the file system integrator 26 has only one storage device interface 16. The file system integrator 26 is able to access multiple storage devices 12a, 12b, and 12c, and hence multiple file systems, by a connection to the storage devices 12a, 12b, and 12c through a multi-port hub 28, such as a USB hub, which connects the storage device interface 16 using, e.g., a cable 30.

In other embodiments, the file system integrator 10 or 26 can be built into the outer casing of the host 14, with only the storage device interface 16 or interfaces 16a, 16b and 16c exposed. Alternatively, the file system integrator 10 or 26 can be joined to a general purpose interface, such as a USB port, of the host 14 and the ports of the multi-port hub 28 or of interfaces 16a, 16b and 16c can be placed in a convenient location for the user of the host 14.

Figure 3:
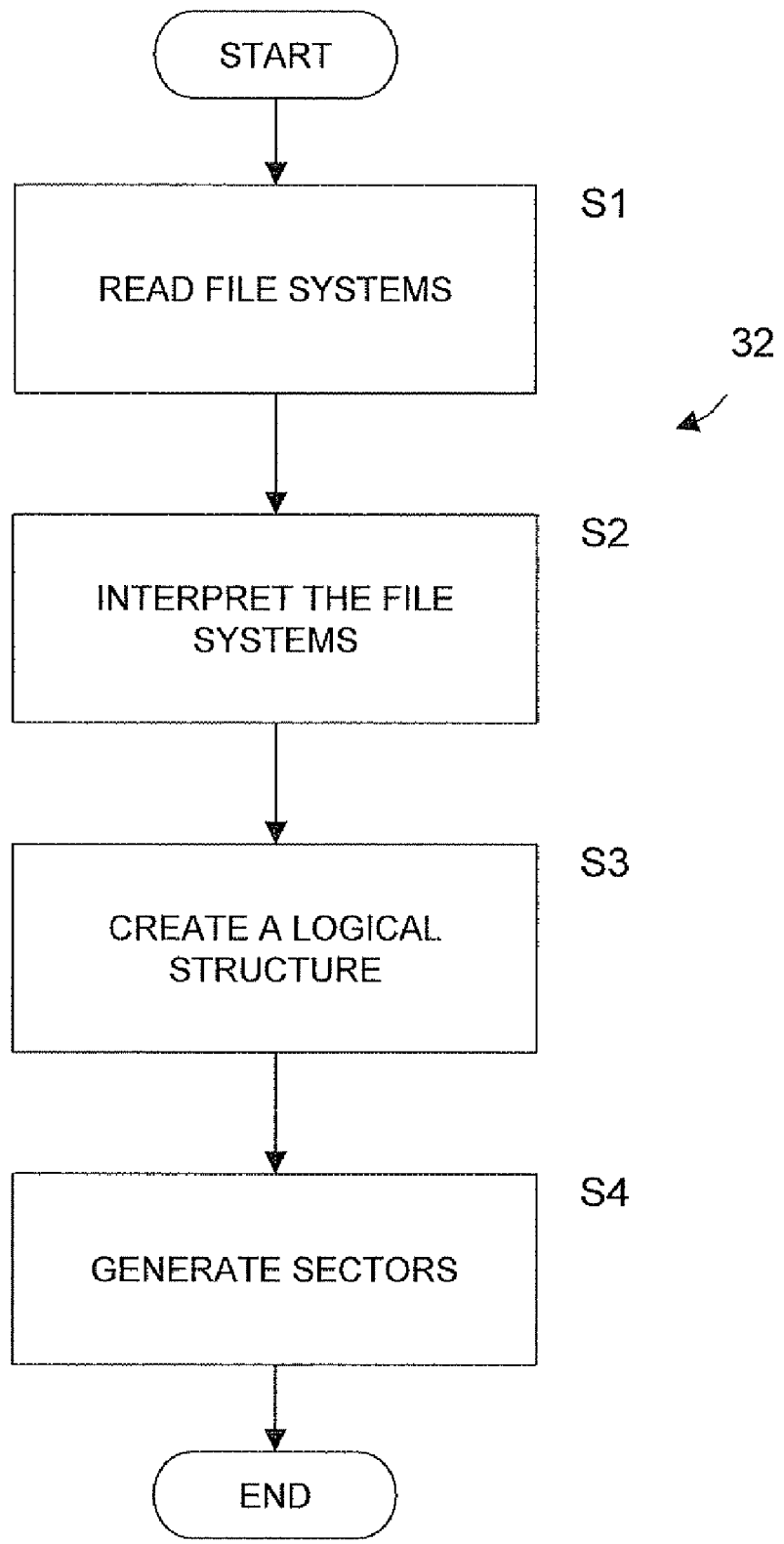
FIG. 3 illustrates a flow chart representing a method of integrating file systems in accordance with an example embodiment.

Another example embodiment of the invention is a method of integrating file systems, as represented by flow chart 32 in FIG. 3. This method may be practiced using the file system integrator 10 of FIG. 1, the file system integrator 26 of FIG. 2, or alternate apparatus. The method enables a user to integrate file systems regardless of any differences in the individual file systems.

As shown in FIG. 3, the first step in the method is to read the file systems of two or more storage devices. (Step S1.)

The next step is to interpret the file systems. (Step S2.) File systems are interpreted by performing logical transformations of data based on information in the file systems and on other factors, such as the type of host (for example, a DVD player or a personal computer), the identity of the user, or the presence of all parts of a spanned file. The data to be transformed does not need to be limited to those of homogenous file systems. Accordingly, file systems may be aggregated from storage devices having differing file system formats.

After the file systems are interpreted, a logical structure is created. (Step S3.) Such a logical structure may be created, e.g., analogously to how logical structures are created by using the "FORMAT" command in Windows® or by using the "mkfs" command in Linux, or in other ways known to those of skill in the art. The logical structure created in step S3 is then populated with the data in the interpreted file systems of step S2.

Then, sectors are generated in a memory, such as in the RAM 25 in the controller 24 of hub 20 (FIG. 1). (Step S4). The sectors map the logical structure into a virtual file system as seen from a host. That is, the generated sectors contain the logical structure of the virtual file system as seen from the host.

Variations of this method are within the scope of the invention. For example, the reading of the file systems may be adapted to include communicating in compliance with the USB standard. The logical structure may be created according to conditions, such as a host-level condition or a file-level condition. The method may include creating and maintaining a redundant file system.

The method may include the step of representing a file in the virtual file system as an undivided entity such that the contents of the file are distributed across two or more of the storage devices. Alternatively, the method may include the step of routing the contents of a file received from a host to only one of the storage devices according to specified conditions.

The method may include the step of representing the virtual file system to a host through a wired interface, which may comply with the USB standard. Alternatively, the method may include representing the virtual file system to a host through a wireless interface, such as one complying with the Bluetooth or Wi-Fi standards.

Having thus described exemplary embodiments, it will be apparent that various alterations, modifications, and improvements will readily occur to those skilled in the art. Alternations, modifications, and improvements of the disclosed embodiments, though not expressly described above, are nonetheless intended and implied to be within spirit and scope of the claims. Accordingly, the foregoing discussion is intended to be illustrative only; the invention is limited and defined only by the following claims and equivalents thereto.

We claim:

1. A device for integrating file systems, the device comprising:
 a plurality of storage device interfaces including a first storage device interface and a second storage device interface, each storage device interface being operatively coupleable to a corresponding storage device of a plurality of storage devices, each storage device having a corresponding storage device file system;
 a host interface; and
 a hub configured for operatively connecting between the storage device interfaces and the host interface, the hub operative to create a virtual file system that aggregates the storage device file systems, wherein the virtual file system is configured to:
  represent to a host, via the host interface, each file of a first group of files stored in one or more of the plurality of storage devices, wherein each file of the first group satisfies a first condition, and
  refrain from representing to the host each file of a second group of files,
 wherein each file of the second group fails to satisfy the first condition,
 wherein the device is configured to distribute a first portion of a first file to a first storage device via the first storage device interface and to distribute a second portion of the first file to a second storage device via the second storage device interface and wherein in response to the second storage device being disconnected from the second storage device interface, the virtual file system is configured to refrain from representing the first file to the host.

2. The device of claim 1, wherein the first condition is satisfied by a particular file when the particular file is readable by the host.

3. The device of claim 2, wherein first condition is a host-level condition.

4. The device of claim 2, wherein the first condition is a file-level condition.

5. The device of claim 1, wherein the hub is further operative to route the contents of a particular file received from the host interface to only one of the storage devices according to a second condition.

6. The device of claim 1, wherein at least one of the storage device interfaces complies with a universal serial bus (USB) standard.

7. The device of claim 1, wherein the host interface is a wired interface.

8. The device of claim 1, wherein the host interface is a wireless interface.

9. The device of claim 1, wherein the first condition is that for a particular file, an entirety of the particular file is available to the host.

10. The device of claim 2, wherein the host is a digital versatile disc (DVD) player.

11. The device of claim 5, wherein the second condition is that the particular file is a digital versatile disc (DVD) file.

12. A method of integrating file systems, the method comprising:
 distributing contents of a first file among a plurality of storage devices, wherein a first portion of the first file is distributed to a first storage device via a first storage device interface and a second portion of the first file is distributed to a second storage device via a second storage device interface, wherein the contents of the first file are represented in a virtual file system by an undivided entity;
 reading file systems of the plurality of storage devices;
 interpreting the file systems to include information relating to a first group of files, wherein each file of the first group of files satisfies a first condition, and to disregard information relating to a second group of files, wherein each file of the second group of files fails to satisfy the first condition;
 creating a logical structure that includes data stored in the interpreted file systems; and
 generating sectors that map the logical structure into the virtual file system,
 wherein in response to the second storage device being disconnected from the second storage device interface, the virtual file system is configured to refrain from representing the first file to a host.

13. The method of claim 12, wherein the first condition is satisfied by a particular file when the particular file is readable by the host coupled to a host interface.

14. The method of claim 12, wherein the first condition is a host-level condition.

15. The method of claim 12, wherein the first condition is a file-level condition.

16. The method of claim 12, further comprising:
 routing contents of a second file received from the host to only one of the storage devices according to a second condition.

17. The method of claim 12, wherein reading the file systems includes communicating in compliance with a universal serial bus (USB) standard.

18. The method of claim 12, further comprising representing the virtual file system to the host through a wired interface, wherein the wired interface complies with a universal serial bus (USB) standard.

19. The method of claim 12, wherein the first condition is satisfied by a particular file when an entirety of the particular file is available to the host.

20. The method of claim 13, wherein the host is a digital versatile disc (DVD) player.

* * * * *

UNITED STATES PATENT AND TRADEMARK OFFICE
CERTIFICATE OF CORRECTION

PATENT NO. : 7,966,288 B2
APPLICATION NO. : 11/968202
DATED : June 21, 2011
INVENTOR(S) : Judah Gamliel Hahn et al.

It is certified that error appears in the above-identified patent and that said Letters Patent is hereby corrected as shown below:

In the Claims

Column 5, Claim 3, Line 62, "The device of claim 2, wherein first condition is a host" should read --The device of claim 2, wherein the first condition is a host--.

Signed and Sealed this
Fifth Day of August, 2014

Michelle K. Lee
*Deputy Director of the United States Patent and Trademark Office*